United States Patent
Robert

(10) Patent No.: US 7,322,240 B2
(45) Date of Patent: Jan. 29, 2008

(54) MICROMACHINED COMB CAPACITIVE ACCELEROMETER

(75) Inventor: Philippe Robert, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 11/305,214

(22) Filed: Dec. 19, 2005

(65) Prior Publication Data

US 2006/0156819 A1    Jul. 20, 2006

(30) Foreign Application Priority Data

Dec. 29, 2004  (FR)  ................................. 04 14031

(51) Int. Cl.
*G01P 15/125*  (2006.01)
(52) U.S. Cl. .................................. 73/514.32
(58) Field of Classification Search ............. 73/514.32, 73/514.36, 514.38, 514.29, 514.16
See application file for complete search history.

(56) References Cited

U.S. PATENT DOCUMENTS

| | | | |
|---|---|---|---|
| 4,653,326 A | | 3/1987 | Danel et al. |
| 6,133,670 A | * | 10/2000 | Rodgers et al. ............. 310/309 |
| 6,508,125 B2 | * | 1/2003 | Otani ....................... 73/514.32 |
| 6,612,029 B2 | * | 9/2003 | Behin et al. ................... 29/847 |
| 6,668,614 B2 | * | 12/2003 | Itakura ........................ 73/1.38 |
| 6,705,166 B2 | * | 3/2004 | Leonardson ............. 73/514.32 |
| 6,744,173 B2 | * | 6/2004 | Behin et al. ................. 310/309 |
| 7,004,028 B2 | * | 2/2006 | Park et al. ............... 73/514.32 |

FOREIGN PATENT DOCUMENTS

| | | |
|---|---|---|
| FR | 2 558 263 | 4/1986 |
| JP | 7-176768 | 7/1995 |

* cited by examiner

*Primary Examiner*—Helen Kwok
(74) *Attorney, Agent, or Firm*—Oblon, Spivak, McClelland, Maier & Neustadt, P.C.

(57) ABSTRACT

A comb capacity accelerometer including: a substrate, a first mobile electrode free to move with respect to the substrate provided with a set of mobile fingers, a first fixed electrode fixed with respect to the substrate and provided with a set of fixed fingers, each of the mobile fingers being arranged between two contiguous fixed fingers so as to form a first microstructure with interdigitised combs, at least one second mobile electrode associated with at least one second fixed electrode to form at least one second microstructure with interdigitised combs superposed on the first microstructure with interdigitised combs, and the second mobile electrode and the second fixed electrode are etched in the same substrate as the first mobile electrode and the first fixed electrode.

13 Claims, 4 Drawing Sheets

MICROMACHINED COMB CAPACITIVE ACCELEROMETER

TECHNICAL DOMAIN

This invention relates to the domain of silicon microsensors and more specifically relates to a micromachined comb capacitive accelerometer comprising a substrate, an electrode free to move with respect to the said substrate provided with a set of mobile sensitive fingers, an electrode fixed with respect to the said substrate and provided with a set of fixed fingers, each of the mobile fingers being arranged between two contiguous fixed fingers so as to form a set of variable capacitors.

STATE OF PRIOR ART

FIG. 1 diagrammatically shows a top view of an accelerometer with interdigitised combs according to prior art comprising a first electrode 2 and a second electrode 4 etched in the same silicon substrate 5. The first electrode 2 is composed of a mobile mass 6 provided with a plurality of fingers 7 extending laterally. The second electrode is composed of two parts 4A, 4B located on each side of the mobile mass 6 and each comprising several fixed fingers 8 extending parallel to the mobile fingers 7. Each of the mobile fingers 7 is arranged between two contiguous fixed fingers so as to define a microstructure with interdigitised combs. The mobile mass 6 is fixed to the substrate 5 through a flexible rod 12 defining a return spring.

During operation, under the effect of an acceleration along the axis of the mobile mass 6, the mobile mass moves in the plane with respect to the substrate 5 causing relative displacement of the mobile fingers 7 with respect to the fixed fingers 8. This relative displacement causes a variation in the capacitance between the mobile fingers 7 and the fixed fingers 8. The acceleration is determined by measuring this variation in capacitance.

In general, these micro-accelerometers are made either on a polycrystalline silicon layer deposited on a sacrificial oxide layer, or on an SOI (Silicon On Insulator) type substrate comprising a buried oxide layer then acting as a sacrificial layer. One example of such a microstructure is described in the applicant's French patent No. FR2558263.

One problem with this type of device is due to the fact that the value of the seismic mass has to be increased in order to increase the device sensitivity. In a planar technology, this causes an increase in the surface area of the chip, and therefore an increase in the cost of the sensor.

Another solution consists of using thicker silicon. In this case etching fineness is lost, particularly at the capacitive combs and the return springs. This results in a reduction of the sensor performances leading to less efficient control over reproducibility during the manufacturing phase.

Furthermore, two sensors are commonly placed side by side to make a bi-axial inertial sensor (along X and along Y), and this occupies a large amount of space.

The purpose of the invention is to overcome the disadvantages of prior art described above.

PRESENTATION OF THE INVENTION

The invention recommends a comb capacitive accelerometer comprising a substrate, a first electrode free to move with respect to the said substrate and provided with a set of mobile fingers, a first electrode fixed with respect to the said substrate and fitted with a set of fixed fingers, each of the said mobile fingers being arranged between two contiguous fixed fingers so as to form a first interdigitised combs microstructure, this accelerometer also comprising at least one second mobile electrode associated with at least one second fixed electrode to form at least one second microstructure with interdigitised combs superposed on the first microstructure with interdigitised combs, the said second mobile electrode and the said second fixed electrode are etched in the same substrate as the said first mobile electrode and the first fixed electrode.

Preferably, the first and second mobile electrodes are each formed by a central mobile mass from which a plurality of mobile fingers extends laterally, and the first and second fixed electrodes are each formed of two parts arranged symmetrically about the said central mobile masses and each comprising a plurality of fixed fingers extending laterally towards the said central masses such that each mobile finger is arranged between two fixed contiguous fingers.

Advantageously, the mobile fingers of the first and second mobile electrodes, and the fixed fingers of the first and second fixed electrodes, are fixed.

Advantageously, the mobile fingers of the first and second mobile electrodes, and the fixed fingers of the first and second fixed electrodes, are dissociated. In this case, the constituents of the first microstructure with interdigitised combs can advantageously be rotated by an angle of 90° from the elements forming the second microstructure with interdigitised combs.

According to a first variant, the mobile fingers of the first and second mobile electrodes are aligned vertically, and the fixed fingers of the first and second fixed electrodes, are aligned vertically.

According to a second variant, the mobile fingers of the first and second mobile electrodes are aligned vertically, and the fixed fingers of the first and second fixed electrodes, are offset from each other vertically.

According to one variant, the mobile masses of the first and second mobile electrodes are fixed.

According to another variant, the mobile masses of the first and second mobile electrodes are dissociated.

In summary, there may be several different variants. For example, in a first variant embodiment, the mobile masses of the first and second mobile electrodes may be fixed, and the mobile fingers of the first and second mobile electrodes, and the fixed fingers of the first and second fixed electrodes, may also be fixed.

In a second variant embodiment, the mobile masses of the first and second mobile electrodes may be fixed, and the mobile fingers of the first and second mobile electrodes and the fixed fingers of the first and second fixed electrodes, may be dissociated.

In this second variant, the mobile fingers of the said first and second mobile electrodes, and the fixed fingers of the said first and second fixed electrodes, may be vertically aligned or offset from each other vertically.

In a third variant embodiment, the mobile masses of the said first and second mobile electrodes may be dissociated, and the mobile fingers of the said first and second mobile electrodes and the fixed fingers of the said first and second fixed electrodes may be dissociated and oriented at 90° with respect to each other to obtain two independent accelerometers, one approximately along the X axis, the other approximately along the Y axis, the two accelerometers being made on the same substrate and one above the other.

Preferably, the first and second mobile electrodes are connected at their ends to the substrate through flexible rods called return arms.

According to a first variant, the flexible rods of the first mobile electrode are fixed to the flexible rods of the second mobile electrode.

According to a second variant, the flexible rods of the first mobile electrode are dissociated from the flexible rods of the second mobile electrode.

Advantageously, the flexible rods are etched directly in the substrate.

The accelerometer according to the invention is made in a substrate comprising a buried sacrificial layer, using a process comprising the following steps:
- formation of a mask on the first substrate on two opposite faces of the said substrate, to define a first microstructure with interdigitised combs superposed on a second microstructure with interdigitised combs, on each side of the said buried superficial layer,
- etching of the first microstructure with interdigitised combs comprising fixed and mobile fingers, a mass and the return arms, on one face of the first substrate, stopping on the buried sacrificial layer,
- formation of a cavity on one face of a second substrate,
- sealing the face of the first substrate comprising the first microstructure with interdigitised combs onto the face of the second substrate facing the cavity in the second substrate,
- etching of the second microstructure with interdigitised combs comprising fixed and mobile fingers, a mass and return arms on the exposed face of the first substrate, stopping on the buried sacrificial layer,
- elimination of at least part of the buried sacrificial layer.

Advantageously, the second substrate used is made of silicon.

Advantageously, the sealing may for example be done by molecular bonding, eutectic sealing, polymer sealing, etc.

According to a first variant, the buried sacrificial layer is eliminated at the level at which the buried sacrificial layer is exposed by etching steps. Thus, the set of mobile fingers is desolidarised from the set of fixed fingers on each microstructure as shown in FIG. 3.

Advantageously, the buried sacrificial layer is eliminated by dry etching, for example by plasma etching.

In a second variant, the buried sacrificial layer is also eliminated at the buried sacrificial layer connecting the fingers of the first microstructure and the fingers of the second microstructure. Thus, the set of mobile fingers can be separated from the set of fixed fingers and the fingers in the first microstructure can be separated from the fingers in the second microstructure as shown in FIG. 4 or 5 described below.

According to a third variant, the buried sacrificial layer is eliminated at the masses. Holes can advantageously be formed (for example by etching) in at least one of the masses to provide access to the sacrificial layer and to facilitate elimination of the sacrificial layer located between the seismic mass on top and the seismic mass underneath as shown in FIG. 6.

Advantageously, the buried sacrificial layer is eliminated by etching with hydrofluoric acid HF in the liquid or vapour state.

Preferably, the manufacturing process also includes a step thinning the exposed face of the substrate between the sealing step and the etching step, stopping before reaching the buried oxide layer.

Advantageously, the thinning step is done by KOH etching.

Preferably, the substrate is an SOI type substrate comprising a buried sacrificial oxide layer $SiO_2$.

BRIEF DESCRIPTION OF THE DRAWINGS

Other characteristics and advantages of the invention will become clear from the following description given as a non-limitative example with reference to the attached figures in which.

DETAILED PRESENTATION OF PARTICULAR EMBODIMENTS

In the remainder of the description, elements common to devices according to prior art and devices according to the invention will be referred to with identical references.

Figure 1:
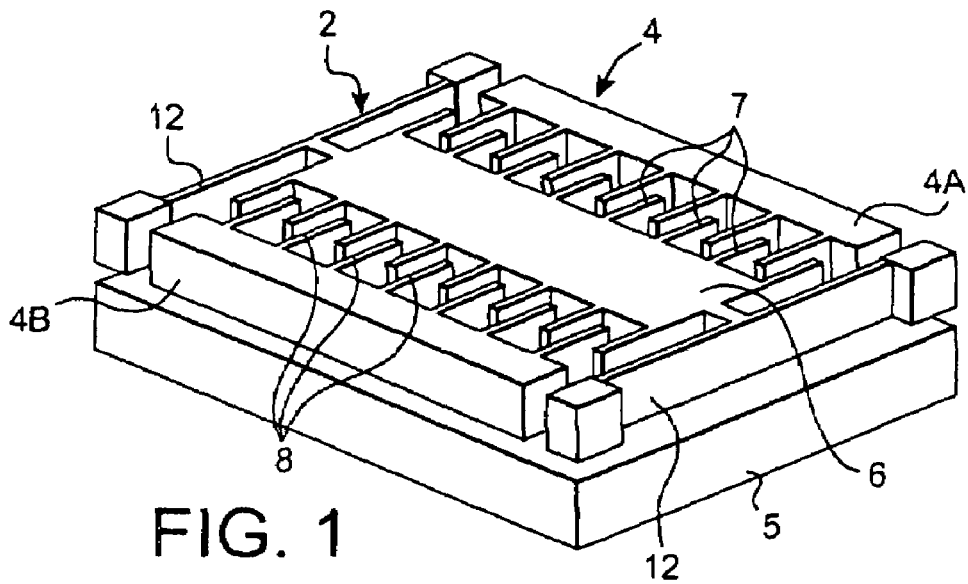
FIG. 1, already described, diagrammatically shows a perspective view of an accelerometer according to prior art, FIG. 2 diagrammatically shows a perspective view showing a partial section of an accelerometer in a preferred embodiment of the invention, FIG. 3 diagrammatically shows a vertical sectional view along the XX axis of an accelerometer in a first variant embodiment of the invention.
Figure 2:
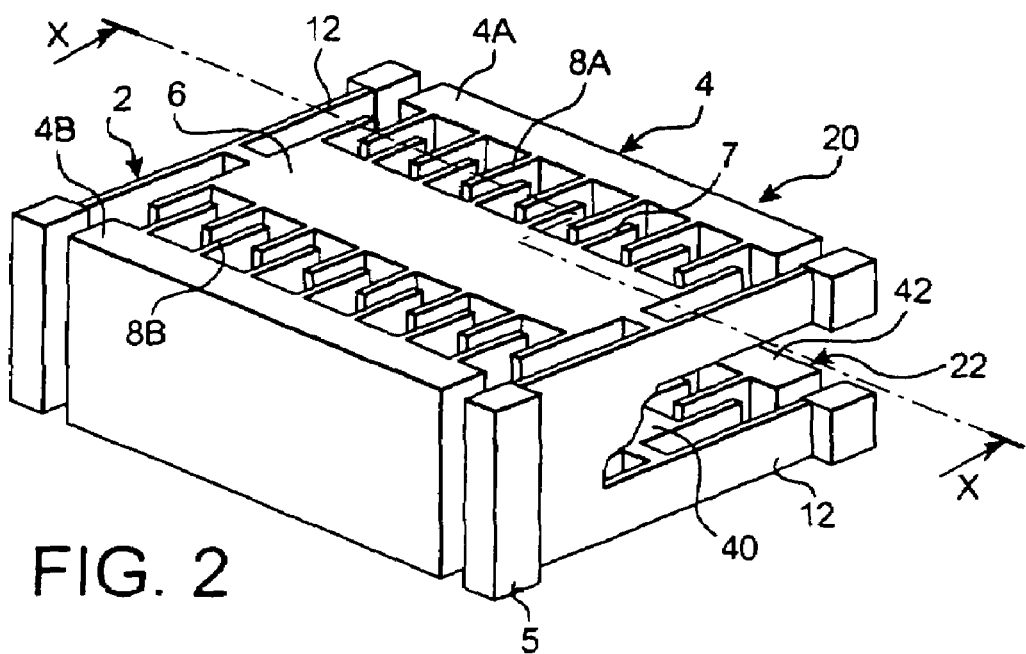

FIG. 2 diagrammatically shows a perspective view of a micromachined comb capacitive accelerometer composed of a first microstructure with interdigitised combs 20 superposed on a second microstructure with interdigitised combs 22. The two structures 20 and 22 are made from an SOI (Silicon On Insulator) type substrate 5.

The microstructure 20 comprises a mobile electrode 2 and a fixed electrode 4. The microstructure 22 comprises a mobile electrode 40 and a fixed electrode 42. The mobile electrode 2 (and 40) is composed of a mobile mass 6 with a rectangular shape etched in the substrate 5 and provided with a set of interdigitised fingers 7 also etched in the substrate 5.

The fixed electrode 4 (and 42) comprises a first part 4A and a second part 4B arranged symmetrically about the mobile mass 6.

The first part 4A and the second part 4B each comprises several fixed fingers 8A, 8B extending laterally towards the mobile mass 6 and parallel to the mobile fingers 7 such that each mobile finger 7 is arranged between 2 contiguous fixed fingers 8A, 8B.

The mobile mass 6 is connected to the fixed electrode (4A, 4B) using flexible rods 12 made by etching in the substrate.

Figure 3:
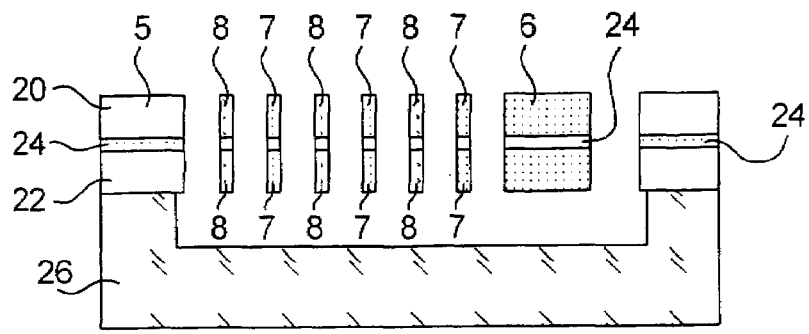

FIG. 3 shows a first variant embodiment in which the mobile masses 6 and the mobile fingers 7 of the first and second microstructures with interdigitised combs 20, 22 are connected through a buried sacrificial layer 24. Similarly, in this variant, the fixed fingers 8A, 8B of the said first and second microstructures are connected through the sacrificial layer 24.

Figure 4:
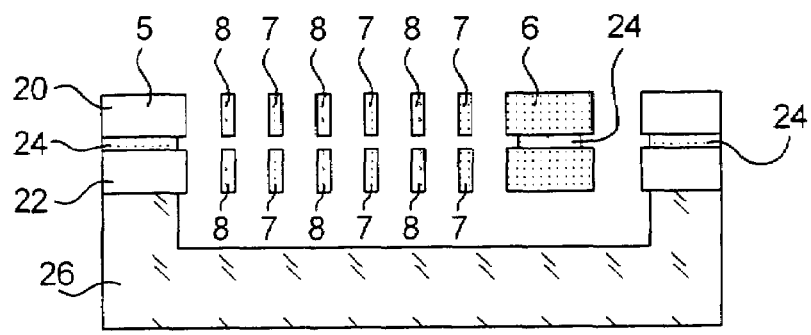
FIG. 4 diagrammatically shows a vertical sectional view along the XX axis of an accelerometer in a second variant embodiment of the invention.

FIG. 4 shows a second variant embodiment in which the mobile masses of the first and second microstructures 20, 22 are fixed while the mobile fingers 7 and the fixed fingers 8 of the said microstructures are dissociated.

Figure 5:
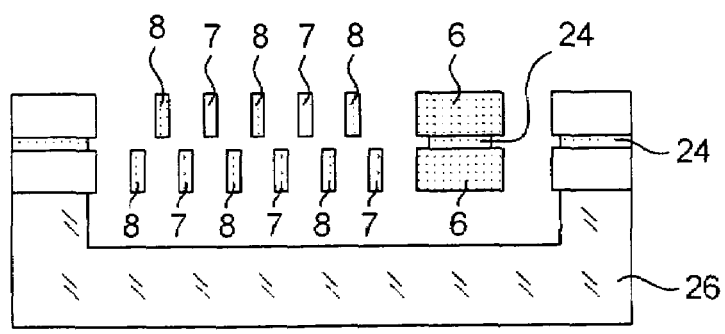
FIG. 5 diagrammatically shows a vertical sectional view along the XX axis of an accelerometer in a second variant embodiment of the invention.

In this second variant, the mobile fingers 7 and the fixed fingers 8 may be either aligned vertically as shown diagrammatically in FIG. 4, or they may be offset from each other in the vertical direction as shown diagrammatically in FIG. 5.

Figure 6:
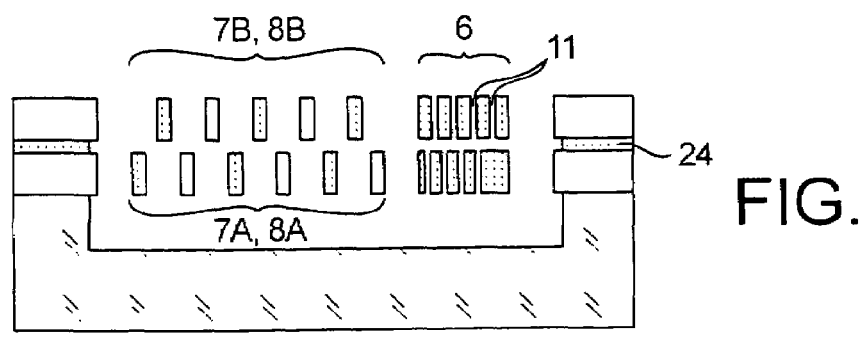
FIG. 6 diagrammatically shows a vertical sectional view along the XX axis of an accelerometer in a third variant embodiment of the invention.

FIG. 6 shows a third variant embodiment in which the microstructures 20, 22 comprise dissociated mobile masses that may be different sizes, a first group of mobile fingers 7A (aligned vertically), and a second group of mobile fingers 7B (offset vertically from each other), and also a first group of fixed fingers 8A (aligned vertically) and a second group of fixed fingers 8B (offset vertically from each other). In this case, the mobile masses were dissociated by etching holes 11 in the thickness of the masses in order to facilitate access to the sacrificial layer. The first group of mobile fingers 7A can also be rotated by 90° with respect to the second group of mobile fingers 7B, and the first group of fixed fingers 8A can be rotated by 90° with respect to the second group of fixed fingers 8B; the result is thus two accelerometers along two different sensitive axes, for example along the X sensitive direction and along the Y sensitive direction, the X and Y axes being orthogonal.

In the variant in which the two structures are independent, there is a choice between:
- having two sensitive accelerometers along the same axis, but with different sensitivities (for example one 10 g and one 50 g), either by varying the mass or the stiffness of the return arms,
- or having two sensitive accelerometers along two orthogonal axes with the same sensitivity (for example 50 g for both).

The accelerometer manufacturing process according to the invention will now be described with reference to FIGS. 7 to 14.

Figure 7:
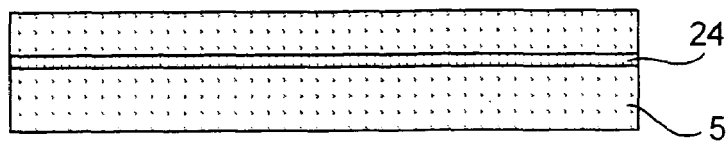
FIGS. 7 to 14 diagrammatically show the different phases of the process for manufacturing an accelerometer according to the invention.

The step shown in FIG. 7 consists of making a mask on an SOI type substrate 5 comprising a buried sacrificial $SiO_2$ oxide layer 24 defining a first microstructure with interdigitised combs superposed on a second microstructure with interdigitised combs on each side of the said surface layer 24.

Figure 8:
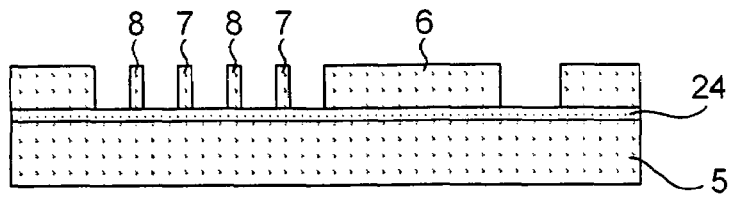

The step shown in FIG. 8 consists for example of etching the fingers 7, 8, the mass 6 and the return arms 12 of the first microstructure 20, on 60 μm in the SOI substrate 5, stopping on the buried oxide layer 24.

Figure 9:
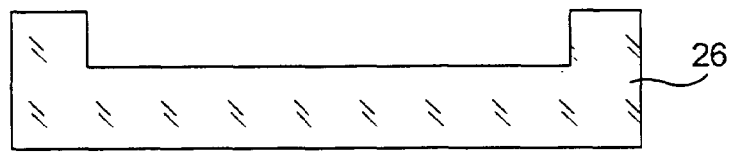

The step shown in FIG. 9 consists of etching a 30 μm cavity on a second Silicon substrate 26.

Figure 10:
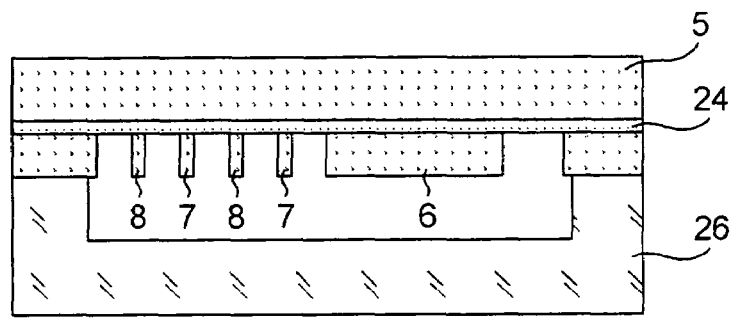

The step shown in FIG. 10 consists of sealing the first substrate 5 on the second substrate 26, for example by molecular bonding, eutectic sealing, polymer sealing, etc.

Figure 11:
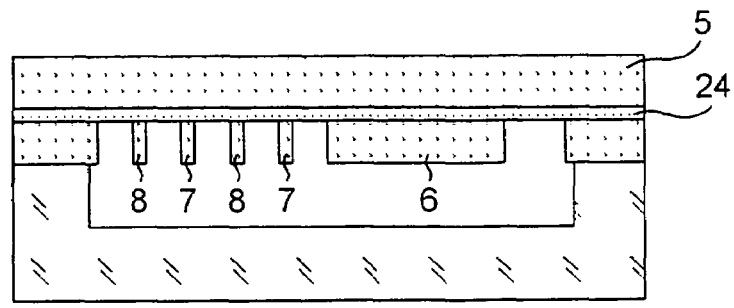

The step shown in FIG. 11 consists of thinning the SOI substrate 5 by KOH etching, stopping about 60 μm from the buried oxide layer 24.

Figure 12:
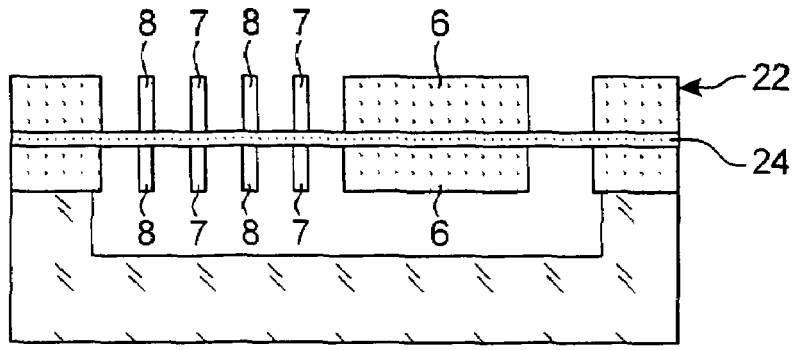

The step shown in FIG. 12 consists of etching the fingers 7, 8, the mass 6 and the return arms 12 of the second microstructure 22 on 60 μm in the SOI substrate 5, stopping on the buried oxide layer 24.

Figure 13:
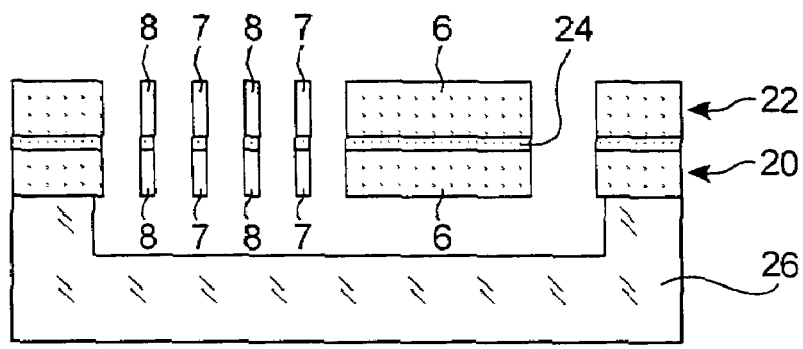

The step shown in FIG. 13 consists of etching the sacrificial layer 24, advantageously by dry etching over its entire thickness (typically from 0.4 to 1 μm depending on the initial SOI substrate) to release the microstructures 20, 22 corresponding to the device in FIG. 3.

Figure 14:
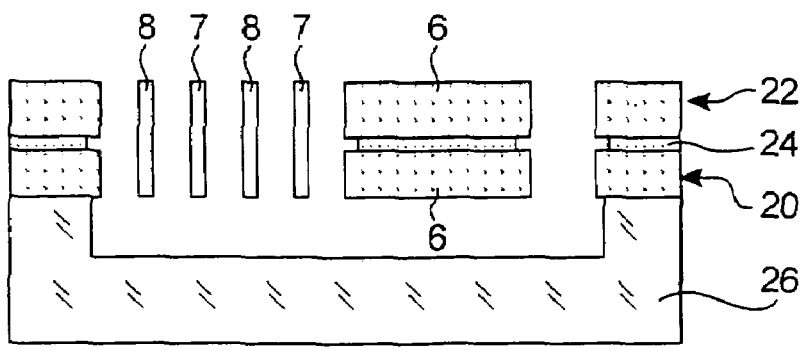

According to another variant, the sacrificial layer can be eliminated as shown in FIG. 14. The step shown in FIG. 14 consists of eliminating the sacrificial layer 24 by wet etching or by vapour hydrofluoric acid HF to separate all mobile fingers 7 from the set of fixed fingers 8 and to separate the fingers of the microstructure 20 from the fingers of the microstructure 22 corresponding to the devices in FIGS. 4, 5 and 6.

This process reduces the dimensions of the accelerometer by superposition of two structures with interdigitised combs on the same substrate. This technique may be used to make a compact biaxial accelerometer.

Note that more than two microstructures can be superposed without going outside the framework of the invention.

The invention claimed is:

1. A comb capacitive accelerometer comprising:
    a substrate,
    a first mobile electrode free to move with respect to said substrate provided with a set of mobile fingers,
    a first fixed electrode fixed with respect to said substrate and provided with a set of fixed fingers, each of the mobile fingers being arranged between two contiguous fixed fingers so as to form a first microstructure with interdigitised combs,
    at least one second mobile electrode associated with at least one second fixed electrode to form at least one second microstructure with interdigitised combs superposed on the first microstructure with interdigitised combs, and
    said second mobile electrode and said second fixed electrode are etched in the same substrate as said first mobile electrode and said first fixed electrode.

2. The accelerometer according to claim 1, in which each of said first and second mobile electrodes is composed of a mobile central mass from which a plurality of mobile fingers extends laterally, and the first and second fixed electrodes are each formed of two parts arranged symmetrically about said central mobile masses and each comprising a plurality of fixed fingers extending laterally towards said central masses such that each mobile finger is arranged between two fixed contiguous fingers.

3. The accelerometer according to claim 2, in which the mobile fingers of the first and second mobile electrodes and the fixed fingers of the first and second fixed electrodes are fixed.

4. The accelerator according to claim 2, in which the mobile fingers of the first and second mobile electrodes and the fixed fingers of the first and second fixed electrodes are dissociated.

5. The accelerometer according to claim 4, in which the mobile fingers of the first and second mobile electrodes and the fixed fingers of the first and second fixed electrodes are aligned vertically.

6. The accelerometer according to claim 4, in which the mobile fingers of the first and second mobile electrodes and the fixed fingers of the first and second fixed electrodes are offset from each other vertically.

7. The accelerometer according to claim 4, in which the mobile fingers, the fixed fingers, and the mobile masses of the first microstructure with interdigitised combs are rotated by an angle of 90° from the mobile fingers, the fixed fingers, and the mobile masses forming the second microstructure with interdigitised combs.

8. The accelerometer according to claim 7, in which the mobile masses of said first and second mobile electrodes are fixed.

9. The accelerometer according to claim 7, in which the mobile masses of said first and second mobile electrodes are dissociated.

10. The accelerometer according to claim 9, in which said first and second mobile electrodes are connected at their respective ends to the substrate through flexible rods.

11. The accelerometer according to claim 10, in which the flexible rods of the first mobile electrode are fixed to the flexible rods of the second mobile electrode.

12. The accelerometer according to claim 10, in which the flexible rods of the first mobile electrode are dissociated from the flexible rods of the second mobile electrode.

13. The accelerometer according to claim 10, in which said flexible rods are etched directly in the substrate.

* * * * *